United States Patent
Lee

(10) Patent No.: US 9,025,944 B2
(45) Date of Patent: May 5, 2015

(54) CAMERA APPARATUS

(71) Applicant: LG Innotek Co., Ltd., Seoul (KR)

(72) Inventor: Jung Hyun Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 60 days.

(21) Appl. No.: 13/756,708

(22) Filed: Feb. 1, 2013

(65) Prior Publication Data

US 2013/0209080 A1 Aug. 15, 2013

(30) Foreign Application Priority Data

Feb. 9, 2012 (KR) .................. 10-2012-0013230

(51) Int. Cl.
*G03B 17/00* (2006.01)
*H04N 5/228* (2006.01)
*G02B 27/64* (2006.01)
*G02B 13/00* (2006.01)

(52) U.S. Cl.
CPC .............. *G02B 27/64* (2013.01); *G02B 13/001* (2013.01); *G02B 27/646* (2013.01)

(58) Field of Classification Search
USPC ........... 396/55, 52; 348/208.99, 208.2, 208.4, 348/208.7, 208.11; 359/554, 557
See application file for complete search history.

(56) References Cited

U.S. PATENT DOCUMENTS

| | | | | |
|---|---|---|---|---|
| 5,122,908 | A | * | 6/1992 | Sporer ........................ 359/557 |
| 2009/0052037 | A1 | * | 2/2009 | Wernersson .................. 359/554 |
| 2010/0290769 | A1 | * | 11/2010 | Nasiri et al. .................... 396/55 |

* cited by examiner

*Primary Examiner* — Rochelle-Ann J Blackman
(74) *Attorney, Agent, or Firm* — Birch, Stewart, Kolasch & Birch, LLP

(57) ABSTRACT

An exemplary embodiment of the present disclosure includes a position detection unit detecting a position of the camera apparatus, a controller outputting a control signal, in a case the position of the camera apparatus detected by the detection unit is a condition for dropping the camera apparatus, and an OIS (Optical Image Stabilization) driving unit receiving the control signal outputted by the controller and being driven to cushion an inner structure of the camera apparatus.

15 Claims, 2 Drawing Sheets

CAMERA APPARATUS

Pursuant to 35 U.S.C. §119 (a), this application claims the benefit of earlier filing date and right of priority to Korean Patent Application No. 10-2012-0013230, filed on Feb. 9, 2012, the contents of which are hereby incorporated by reference in their entirety.

BACKGROUND OF THE DISCLOSURE

1. Field of Endeavor

The present disclosure relates to a camera apparatus.

2. Background

This section provides background information related to the present disclosure which is not necessarily prior art.

Recently, in concomitant with fast spread of camera apparatuses, consumer demands on photographing high-quality still photographs and moving pictures are on the increase. Furthermore, an OIS (Optical Image Stabilization) driving unit performing a compensation for camera shake, that is vibration of the camera apparatus typically caused by user hand movement, is increasingly adopted to prevent resolution degradation of photographs caused by the user handshake.

The OIS (Optical Image Stabilization) driving unit is configured such that the handshake or external vibration and shock of the camera apparatus is compensated by moving an image sensor such as a charge coupled device (CCD) or a complementary metal oxide semiconductor (CMOS), or by moving an optical lens.

Recently, most of the mobile devices are mounted with a camera apparatus to photograph an image of an object. The mobile device is subject to unintentional drop while being hand-carried by a user, resulting in possible destruction of parts such as camera apparatus by a drop shock.

SUMMARY OF THE DISCLOSURE

This section provides a general summary of the disclosure, and is not a comprehensive disclosure of its full scope or all of its features.

The present disclosure provides a camera apparatus configured to compensate shock of inner structures of the camera apparatus caused by drop.

It should be emphasized, however, that the present disclosure is not limited to a particular disclosure, as explained above. It should be understood that other technical subjects not mentioned herein may be appreciated by those skilled in the art.

In one general aspect of the present disclosure, there is provided a camera apparatus, the camera apparatus comprising: a position detection unit detecting a position of the camera apparatus; a controller outputting a control signal, in a case the position of the camera apparatus detected by the position detection unit is a condition for dropping the camera apparatus; and an OIS (Optical Image Stabilization) driving unit receiving the control signal outputted by the controller and being driven to cushion an inner structure of the camera apparatus.

Preferably, but not necessarily, the OIS driving unit may be driven by a lens barrel shift method or a camera module tilt method.

Preferably, but not necessarily, the camera apparatus may further comprise a lens barrel accommodated with at least one or more sheets of lenses; and a case embedded with the lens barrel, wherein the OIS driving unit is a driver moving the lens barrel.

Preferably, but not necessarily, the OIS driving unit may include a coil mounted on the lens barrel, and a magnet mounted inside the case.

Preferably, but not necessarily, the OIS driving unit may include a magnet mounted on the lens barrel, and a coil mounted inside the case.

Preferably, but not necessarily, the lens barrel may be suspended inside and to the case by a wire spring.

Preferably, but not necessarily, the lens barrel may be suspended inside and to the case by a wire spring, and applied with a current by being connected to the coil via the wire spring.

Preferably, but not necessarily, the camera apparatus may further comprise an elastic unit functioning to restore the lens barrel to an original position, in a case an electromagnetic action of the OIS driving unit disappears.

Preferably, but not necessarily, the camera apparatus may further comprise a camera module capable of photographing an optical image of an object; and a case embedded with the camera module, wherein the OIS driving unit is a driver moving the camera module.

Preferably, but not necessarily, the OIS driving unit may include a magnet mounted on the camera module, and a coil mounted inside the case.

Preferably, but not necessarily, the OIS driving unit may include a coil mounted on the camera module, and a magnet mounted inside the case.

Preferably, but not necessarily, the OIS driving unit may include a coil mounted on the camera module, and a magnet mounted inside the case.

Preferably, but not necessarily, the camera module may be suspended inside and to the case by a wire spring.

Preferably, but not necessarily, the camera module may be formed at a center of a bottom surface of the camera module with a groove to prevent a weight shift of the camera module, and the case may be formed with a pivot inserted into the groove.

Preferably, but not necessarily, the camera module may be suspended inside and to the case by a wire spring, and applied with a current by being connected to the coil via the wire spring.

Preferably, but not necessarily, the camera module may be formed at a center of a bottom surface of the camera module with a groove to prevent a weight shift of the camera module, and the case may be formed with a pivot inserted into the groove.

Preferably, but not necessarily, the groove may be formed at a separate support unit positioned at a bottom surface of the camera module.

Preferably, but not necessarily, the camera apparatus may further comprise an elastic unit functioning to restore the camera module to an original position, in a case an electromagnetic action of the OIS driving unit disappears.

Preferably, but not necessarily, the elastic unit may be connected to the camera module and the case.

Preferably, but not necessarily, the position detection unit may include any one of a gyro sensor, an acceleration sensor and an angular velocity.

The present disclosure has an advantageous effect in that drop of a camera apparatus is detected by a position data detected by a detection sensor of the camera apparatus to drive an OIS driving unit, whereby shock to an inner structure of the camera apparatus caused by the drop can be cushioned.

BRIEF DESCRIPTION OF THE DRAWINGS

In order to explain the principle of the present disclosure, some accompanying drawings related to its preferred embodiments are below reported for the purpose of illustration, exemplification and description, although they are not intended to be exhaustive. The drawing figures depict one or more exemplary embodiments in accordance with the present concepts, by way of example only, not by way of limitations. In the figures, like reference numerals refer to the same or similar elements.

Thus, a wide variety of potential practical and useful embodiments will be more readily understood through the following detailed description of certain exemplary embodiments, with reference to the accompanying exemplary drawings in which.

DETAILED DESCRIPTION

Figure 1:
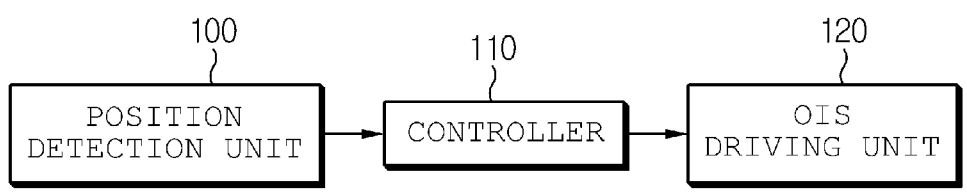
FIG. 1 is a block diagram illustrating a camera apparatus according to an exemplary embodiment of the present disclosure.

Hereinafter, exemplary embodiments of the present disclosure will be described in detail with reference to the accompanying drawings.

In describing the present disclosure, detailed descriptions of constructions or processes known in the art may be omitted to avoid obscuring appreciation of the invention by a person of ordinary skill in the art with unnecessary detail regarding such known constructions and functions. That is, in the drawings, the size and relative sizes of layers, regions and/or other elements may be exaggerated or reduced for clarity. Like numbers refer to like elements throughout and explanations that duplicate one another will be omitted.

Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

FIG. 1 is a block diagram illustrating a camera apparatus according to an exemplary embodiment of the present disclosure.

The camera apparatus according to an exemplary embodiment of the present disclosure include a position detection unit (100) detecting a position of the camera apparatus; a controller (110) outputting a control signal, in a case the position of the camera apparatus detected by the position detection unit (100) is a condition for dropping the camera apparatus; and an OIS (Optical Image Stabilization) driving unit (120) receiving the control signal outputted by the controller (110) and being driven to cushion an inner structure of the camera apparatus.

That is, the position detection unit (100) detects the position of the camera apparatus in a case the camera apparatus drops, and the controller (110) determines whether detected position data of the camera apparatus satisfies a drop condition of the camera apparatus.

At this time, the controller (110) outputs a control signal to the OIS (Optical Image Stabilization) driving unit (120), in a case the detected position data of the camera apparatus detected by the position detection unit (100) is a condition for dropping the camera apparatus, and the OIS driving unit (120) can be driven to cushion a shock of an inner structure of the camera apparatus caused by the drop of the camera apparatus. At this time, the position detection unit (100) includes any one of a gyro sensor, an acceleration sensor and an angular velocity.

Figure 2:
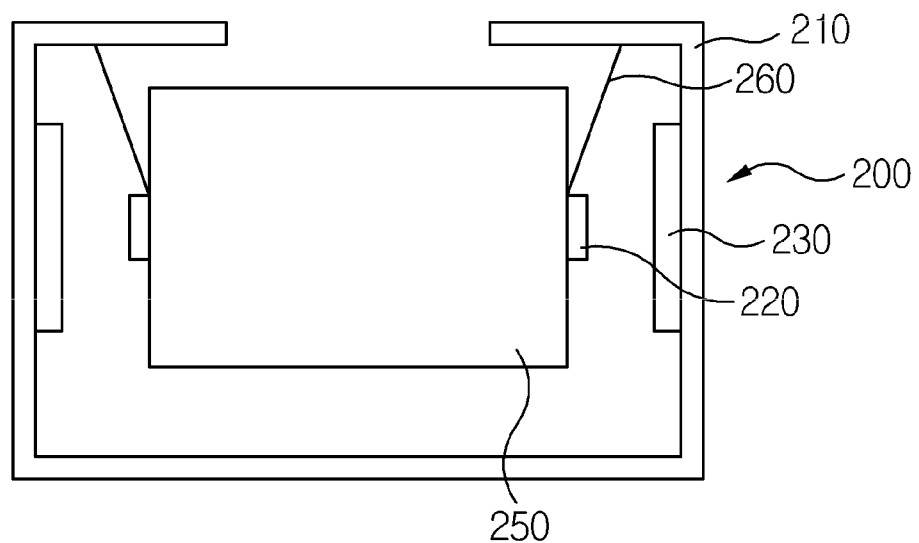
FIG. 2 is a mimetic cross-sectional view illustrating a camera apparatus according to an exemplary embodiment of the present disclosure.

FIG. 2 is a mimetic cross-sectional view illustrating a camera apparatus (200) according to an exemplary embodiment of the present disclosure.

The OIS driving unit in the camera apparatus (200) according to an exemplary embodiment of the present disclosure may be a driver operated by a lens barrel shift method or a camera module tilt method.

Referring to FIG. 2, the camera apparatus (200) by the lens barrel shift method includes a lens barrel (250) accommodated with at least one or more sheets of lenses, and a case (210) embedded with the lens barrel (250).

Furthermore, the OIS driving unit by the lens barrel shift method is a driver moving the lens barrel (250) and includes a coil (220) mounted on the lens barrel (250), and a magnet (230) mounted inside the case (210).

At this time, the installation positions of the coil (260) and the magnet (230) on the lens barrel (250) and the case (210) may be alternatively implemented. That is, the coil (220) may be mounted inside the case (210), and magnet (230) may be mounted on the lens barrel (250). Furthermore, the lens barrel (250) may be suspended inside and to the case (210) by a wire spring (260).

At this time, the wire spring (260) may provide flexibility for horizontal motion of the lens barrel (250) and apply a current by being connected to the coil (220). That is, in a case a current is applied to the coil (220) via the wire spring (260), an electromagnetic force is generated between the coil (220) and the magnet (230), where the electromagnetic force restricts motions to x axis and to y axis, whereby the wire spring (260) can perform the cushioning action lest the camera apparatus be destructed, even if a high stress is applied to the lens barrel (250).

Meanwhile, the camera apparatus may further include an elastic unit functioning to restore the lens barrel to an original position, in a case an electromagnetic action of the OIS driving unit disappears. In addition, the elastic unit may be connected to the lens barrel and the case.

Figure 3:
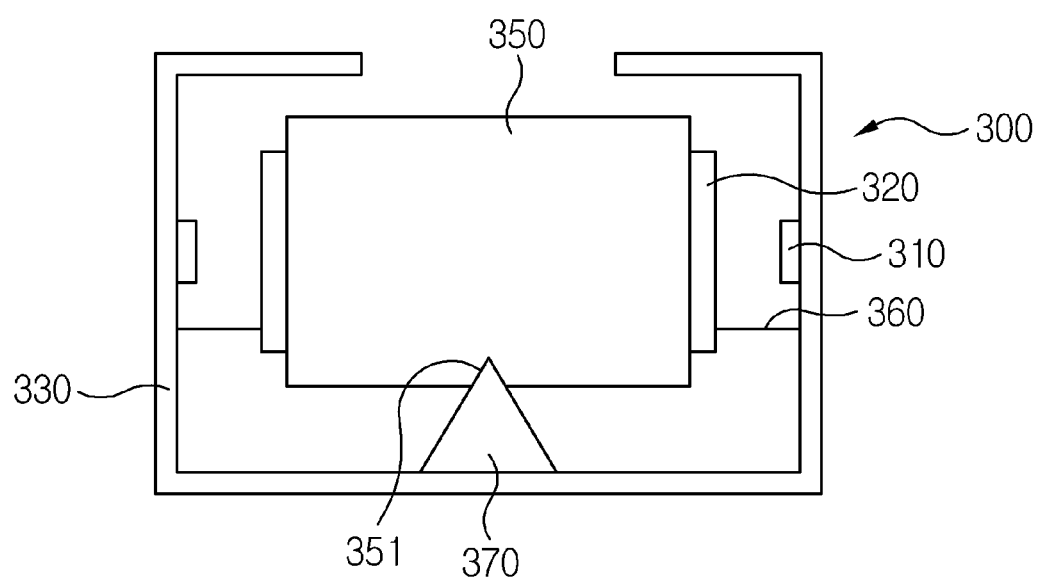
FIG. 3 is a mimetic cross-sectional view illustrating a camera apparatus according to another exemplary embodiment of the present disclosure.

FIG. 3 is a mimetic cross-sectional view illustrating a camera apparatus (300) according to another exemplary embodiment of the present disclosure.

The OIS driving unit in the camera apparatus of FIG. 3 includes a driver operated by a camera module tilt method. The camera apparatus (300) by the camera module tilt method includes a camera module (350) capable of photographing an optical image of an object and a case (330) embedded inside the camera module (350). At this time, the OIS driving unit may include a magnet (320) mounted on the camera module (350) and a coil (310) mounted inside the case (330). At this time, the coil (310) and the magnet (320) may be alternatively positioned.

Furthermore, the camera module (350) may be suspended inside and to the case (330) by a wire spring (360), and a current may be applied to the coil (310) via the wire spring (360).

Thus, even in the camera apparatus (300) by the camera module tilt method, in a case a current is applied to the coil (310) via the wire spring (360), an electromagnetic force is generated between the coil (310) and the magnet (320), where the electromagnetic force restricts motions to x axis and to y axis of the camera module (350), whereby the cushioning action is performed to prevent inner structure of the camera module (350) from being destructed.

At this time, the camera module (350) may be formed at a center of a bottom surface with a groove (351) to prevent a weight shift of the camera module (350) and the case (330) may be formed with a pivot (370) inserted into the groove (351). The groove (351) and the pivot (370) serve to balance the camera module (350) before and after the operation of an OIS driving unit. The groove (351) may be formed at a separate support unit positioned at a bottom surface of the camera module (350). The wire spring (360) may serve to support the camera module (350) at the pivot (370). Furthermore, the wire spring (360) may function to restore the camera module (350) to an original position, in a case an electromagnetic action of the OIS driving unit disappears. The camera apparatus may further include an elastic unit functioning to restore the camera module to an original position.

That is, the elastic unit may be connected to the lens barrel (250) and the case (210) of FIG. 2, or connected to the camera module (350) and the case (330) of FIG. 3, and may be realized by a member such as a wire spring and a leaf spring having an excellent restoring force to an original position, in a case an electromagnetic action of the OIS driving unit disappears due to no power supply to the coil of the OIS driving unit. However, the present disclosure is not limited thereto.

As apparent from the foregoing, the present disclosure has an industrial applicability in that drop of a camera apparatus is detected by a position data detected by a detection sensor of the camera apparatus to drive an OIS driving unit, whereby shock to an inner structure of the camera apparatus caused by the drop can be cushioned.

Although the present disclosure has been described with reference to a number of illustrative embodiments thereof, it should be understood that numerous other modifications and embodiments can be devised by those skilled in the art that will fall within the spirit and scope of the principles of this disclosure.

What is claimed is:

1. A camera apparatus, the camera apparatus comprising:
    a position detection unit detecting a position of the camera apparatus;
    an OIS (Optical Image Stabilization) driving unit configured to perform a handshake compensation; and
    a controller configured to determine whether the camera apparatus drops in response to the position detected by the position detection unit and to output a control signal to the OIS driving unit for cushioning an inner structure of the camera apparatus when the controller determines that the camera apparatus drops.

2. The camera apparatus of claim 1, wherein the OIS driving unit is driven by a lens barrel shift method or a camera module tilt method.

3. The camera apparatus of claim 1, further comprising a lens barrel accommodated with at least one or more sheets of lenses; and a case embedded with the lens barrel, wherein the OIS driving unit is a driver moving the lens barrel.

4. The camera apparatus of claim 3, wherein the OIS driving unit includes a coil mounted on the lens barrel, and a magnet mounted inside the case.

5. The camera apparatus of claim 3, wherein the OIS driving unit includes a magnet mounted on the lens barrel, and a coil mounted inside the case.

6. The camera apparatus of claim 3, wherein the lens barrel is suspended inside and to the case by a wire spring.

7. The camera apparatus of claim 4, wherein the lens barrel is suspended inside and to the case by a wire spring, and applied with a current by being connected to the coil via the wire spring.

8. The camera apparatus of claim 1, further comprising a camera module capable of photographing an optical image of an object; and a case embedded with the camera module, wherein the OIS driving unit is a driver moving the camera module.

9. The camera apparatus of claim 8, wherein the OIS driving unit includes a magnet mounted on the camera module, and a coil mounted inside the case.

10. The camera apparatus of claim 8, wherein the OIS driving unit includes a coil mounted on the camera module, and a magnet mounted inside the case.

11. The camera apparatus of claim 8, wherein the camera module is suspended inside and to the case by a wire spring.

12. The camera apparatus of claim 10, wherein the camera module is suspended inside and to the case by a wire spring, and applied with a current by being connected to the coil via the wire spring.

13. The camera apparatus of claim 12, wherein the camera module is formed at a center of a bottom surface of the camera module with a groove to prevent a weight shift of the camera module and the case is formed with a pivot inserted into the groove, and
    wherein the pivot protrudes from a lower surface of the case.

14. The camera apparatus of claim 1, wherein the position detection unit includes any one of a gyro sensor, an acceleration sensor and an angular velocity.

15. A camera apparatus, the camera apparatus comprising:
    a position detection unit detecting a position of the camera apparatus;
    a camera module capable of photographing an optical image of an object;
    a case embedded with the camera module;
    an OIS (Optical Image Stabilization) driving unit configured to perform a handshake compensation; and
    a controller configured to determine whether the camera apparatus drops in response to the position detected by the position detection unit and to output a control signal to the OIS driving unit for cushioning an inner structure of the camera apparatus when the controller determines that the camera apparatus drops,
    wherein the camera module is suspended inside and to the case by a wire spring,
    wherein the camera module is formed at a center of a bottom surface of the camera module with a groove, and a pivot inserted into the groove is disposed on the case, and
    wherein the pivot protrudes from a lower surface of the case.

* * * * *